United States Patent
Colosky

(12) 
(10) Patent No.: US 6,530,269 B1
(45) Date of Patent: Mar. 11, 2003

(54) ENHANCED MOTOR VELOCITY MEASUREMENT USING A BLEND OF FIXED PERIOD AND FIXED DISTANCE TECHNIQUES

(75) Inventor: Mark Philip Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/659,245

(22) Filed: Sep. 11, 2000

Related U.S. Application Data

(60) Provisional application No. 60/154,269, filed on Sep. 16, 1999.

(51) Int. Cl.$^7$ .............................................. G01M 15/00
(52) U.S. Cl. ..................................... 73/118.1; 73/119 R
(58) Field of Search ................................ 73/116, 117.2, 73/118.1, 117.3, 119 R; 340/425.5, 438, 441

(56) References Cited

U.S. PATENT DOCUMENTS

| | | | |
|---|---|---|---|
| 3,731,533 A | 5/1973 | Geery .......................... 73/231 |
| 4,008,378 A | 2/1977 | Nance et al. .............. 179/15 A |
| 4,437,061 A | 3/1984 | Shinozaki et al. | |
| 4,562,399 A | 12/1985 | Fisher ......................... 322/94 |
| 4,803,425 A | 2/1989 | Swanberg | |
| 4,836,319 A | 6/1989 | Haseda et al. .............. 180/142 |
| 4,838,074 A | 6/1989 | Morishita et al. | |
| 4,897,603 A | 1/1990 | Bieber et al. | |
| 4,922,197 A | 5/1990 | Juds et al. | |
| 4,924,161 A | 5/1990 | Ueki et al. | |
| 4,924,696 A | 5/1990 | Schroeder | |
| 4,955,228 A | 9/1990 | Hirose et al. | |
| 4,961,017 A | 10/1990 | Kakinoki et al. .............. 310/71 |
| 4,983,915 A | 1/1991 | Rossi .................... 324/207.17 |
| 5,027,648 A | 7/1991 | Filleau | |
| 5,029,466 A | 7/1991 | Nishihara et al. | |
| 5,088,319 A | 2/1992 | Hirose et al. | |
| 5,218,279 A | 6/1993 | Takahashi et al. .......... 318/560 |
| 5,223,760 A | 6/1993 | Peck et al. ................... 310/168 |
| 5,293,125 A | 3/1994 | Griffen et al. | |
| 5,309,758 A | 5/1994 | Kubota et al. | |
| 5,329,195 A | 7/1994 | Horber et al. | |
| 5,406,267 A | 4/1995 | Curtis ......................... 340/653 |
| 5,408,153 A | 4/1995 | Imai et al. ..................... 310/68 |
| 5,498,072 A | 3/1996 | Shimizu ...................... 303/191 |
| 5,503,421 A | 4/1996 | DeLisser et al. ......... 280/441.1 |
| 5,717,268 A | 2/1998 | Carrier et al. | |
| 5,736,852 A | 4/1998 | Pattantyus ................... 324/166 |
| 5,816,360 A | * 10/1998 | Spillner ...................... 180/417 |
| 5,828,973 A | 10/1998 | Takeuchi et al. | |
| 5,902,342 A | 5/1999 | Mishra | |
| 6,155,106 A | 12/2000 | Sano | |
| 6,244,372 B1 | * 6/2001 | Sakamaki et al. .......... 180/422 |
| 6,244,373 B1 | * 6/2001 | Kojo et al. .................. 180/443 |
| 6,246,197 B1 | * 6/2001 | Kurishige et al. .......... 180/443 |
| 6,250,417 B1 | * 6/2001 | Kaji et al. ................... 180/421 |
| 6,286,621 B1 | * 9/2001 | Mukai et al. ................ 180/446 |

FOREIGN PATENT DOCUMENTS

| | | |
|---|---|---|
| DE | 1 484 796 | 2/1975 |
| JP | 8-211081 | 8/1996 |

\* cited by examiner

Primary Examiner—Eric S. McCall
(74) Attorney, Agent, or Firm—Edmund P. Anderson

(57) ABSTRACT

A method of estimating the angular velocity of an electric power steering motor for an automobile is disclosed. The method comprises estimating an average angular velocity of the motor; estimating an instantaneous angular velocity of the motor; weighting the estimated average angular velocity of the motor; weighting the estimated instantaneous angular velocity of the motor; and combining the weighted estimated average angular velocity of the motor and the weighted estimated instantaneous angular velocity of the motor.

12 Claims, 2 Drawing Sheets

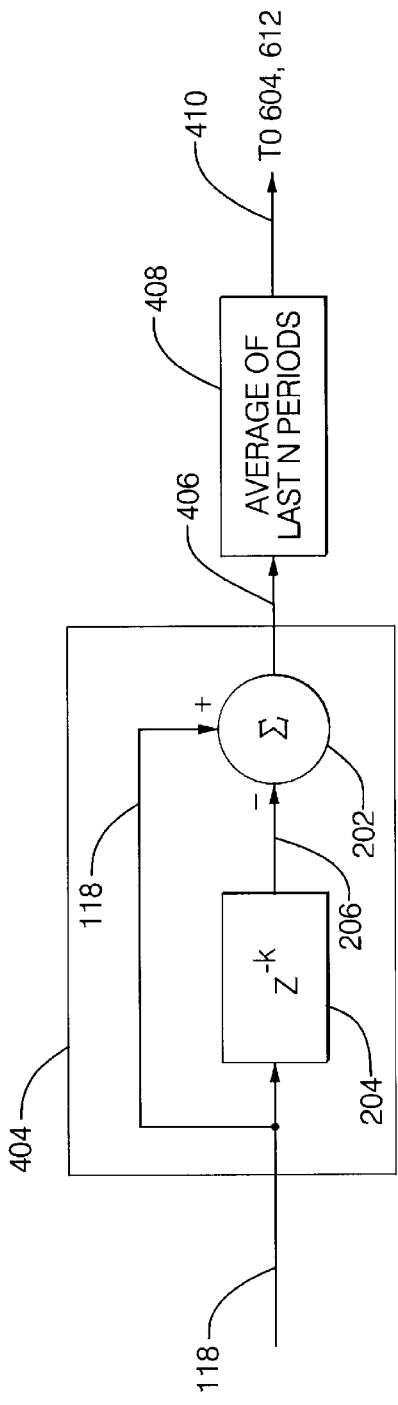
FIG. 3
FIG. 4
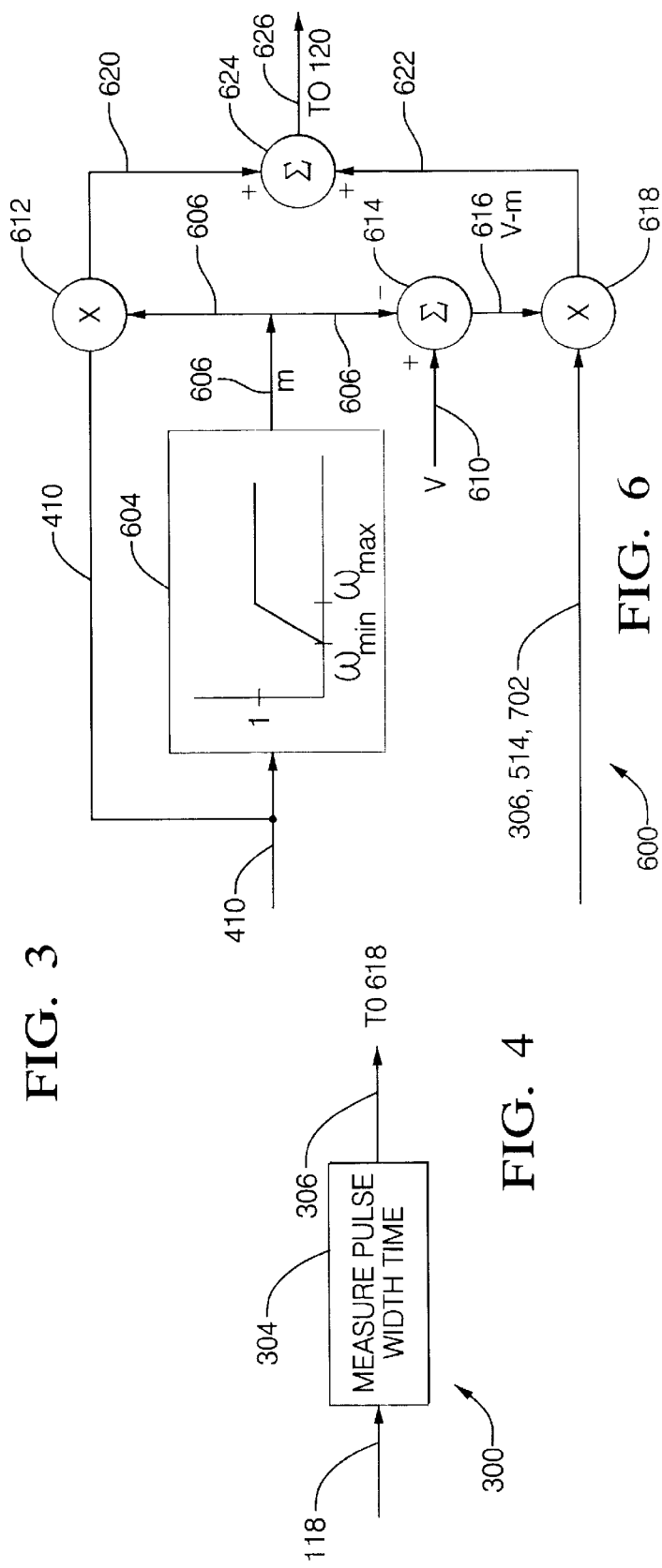
FIG. 6

ENHANCED MOTOR VELOCITY MEASUREMENT USING A BLEND OF FIXED PERIOD AND FIXED DISTANCE TECHNIQUES

CROSS REFERENCE TO RELATED APPLICATIONS

This application claims the benefit of U.S. Provisional Patent Application No. 60/154,269 filed on Sep. 16, 1999, the entire contents of which are incorporated herein by reference.

TECHNICAL FIELD

This invention relates to a method and system for estimating the angular velocity of an electric power steering motor for an automobile.

BACKGROUND OF THE INVENTION

An electric power steering apparatus for a motor vehicle typically uses an electric motor to assist an operator in applying the necessary torque required to steer the vehicle. When the vehicle is steered with a steering wheel operably connected to a set of road wheels, a sensor in the electric power steering apparatus detects the angular position and/or velocity of the motor. A signal is then sent from the sensor to an electric controller. The electric controller controls the magnitude and direction of the steering assist provided by the electric motor. The electric motor drives a reducing gear, typically a worm gear engaging a worm wheel, that lessens the torque required to turn the steering wheel. Electric steering systems often utilize a motor with a digital encoder for a position sensor. It is desireable to provide an electric power steering system that optimizes the estimation of the angular velocity of a motor at low and high velocities.

SUMMARY OF THE INVENTION

In an exemplary embodiment of the invention a method of optimizing the estimation of the angular velocity of an electric power steering motor for an automobile is disclosed. The method comprises estimating an average angular velocity of the motor; estimating an instantaneous angular velocity of the motor; weighting the estimated average angular velocity of the motor; weighting the estimated instantaneous angular velocity of the motor; and combining the weighted estimated average angular velocity of the motor and the weighted estimated instantaneous angular velocity of the motor.

The motor position signal can be used to estimate the angular velocity of the motor, by determining the change in angular position of the motor divided by the change in time. Additionally the motor velocity may be directly measured by a tachometer or other such device.

Given the discrete nature of the digital motor position signal, the resulting velocity signal can be computed using one of two fundamental techniques. The first involves measuring the motor angular change and dividing by a set period of time. The second involves measuring the amount of time between a known motor angle change. The first method yields good results when the motor is rotating at a relatively high velocity and the second method yields good results when the motor is rotating at a relatively low velocity.

If a motor velocity sensor is used, the optimization of the sensing system may utilize the motor velocity sensor at low motor velocity operation and a position based signal at high velocities By utilizing different velocity estimation techniques for high motor velocity and low motor velocity, the estimation of the angular velocity of the electric motor may be optimized for bandwidth, resolution and accuracy over a prescribed speed range.

DESCRIPTION OF THE DRAWINGS

FIG. 3 is a generalized schematic representation of a discrete position difference calculation of the averager of FIG. 2;

FIG. 4 is a generalized schematic representation of a low velocity estimator;

FIG. 6 is a generalized schematic representation of a motor velocity blending function of the present invention.

DESCRIPTION OF THE PREFERRED EMBODIMENTS

Figure 1:
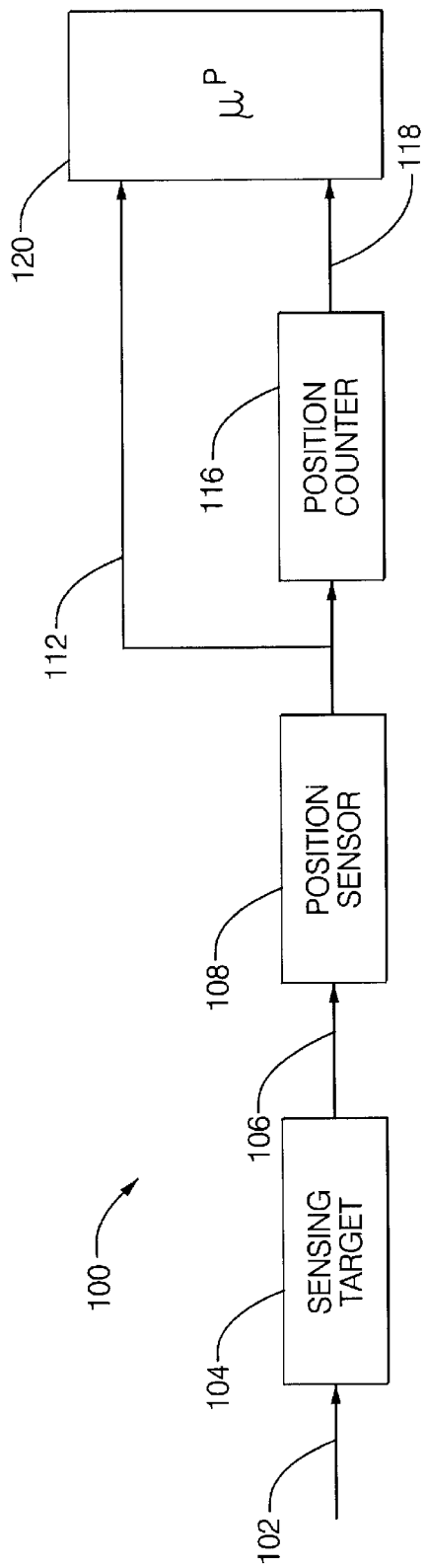
FIG. 1 is a generalized schematic representation of a control system.

Referring to FIG. 1, a control system for optimizing the estimation of the angular velocity of an electric power steering motor for an automobile is shown generally at 100. The control system 100 comprises a pulse encoded sensing target 104 attached to a motor shaft (not shown) and provides the rotating half of a motor position sensor. Typical sensing targets utilize slotted disks, etched glass or magnetic disks. The sensing target 104 is operative to accept as input thereto the motor angle, θ, 102. The sensing target 104 provides as output a signal 106 indicative of the angular position, θ, of the motor shaft. A position sensor receiver 108 is attached to the non-rotating part of the motor and accepts the signal 106 as input thereto and provides as output a digital signal 112, indicative of the relative angular position, $\theta_r$, of the motor shaft. The output signal 112 is provided as input to a microprocessor 120 for processing thereof. An angular position counter 116 accepts signal 112 as input thereto and provides as output a signal 118 indicative of the absolute position, $\theta_a$, of the motor. The microprocessor 120 is operative to accept as input signal 112 to compute the instantaneous angular velocity, $\omega_i$, and signal 118 to compute the average velocity, $\omega_{avg}$.

Figure 2:
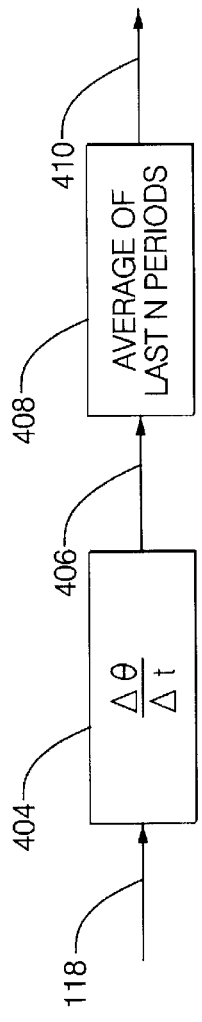
FIG. 2 is a generalized schematic representation of an averager.

In FIG. 2, a high velocity averager is shown generally at 400. The averager 400 comprises an angular velocity estimator 404 operative to accept as input thereto the signal 118 indicative of the absolute angular position, $\theta_a$, of the motor shaft. The angular velocity estimator 404 calculates the angular velocity of the motor shaft by counting the number of encoder pulses over a prescribed period of time, Δt, and provides as output a signal 406 which is averaged at 408 over the last N periods, providing thereby the average estimated angular velocity 410 of the motor.

In FIG. 3, the angular velocity estimator 404 comprises a signal delay element 204 and a summer 202. The signal delay element 204 accepts as input thereto the absolute angular position, $\theta_a$, of the motor shaft 118 and delays that signal by k counts. The $k^{th}$ previous motor position 206 is subtracted at the summer 202 from the current motor position input 118. Typically, k=1. The resultant change in the motor position 406 is then averaged at 408 over N periods providing thereby, the average angular velocity 410 of the motor shaft.

Figure 5:
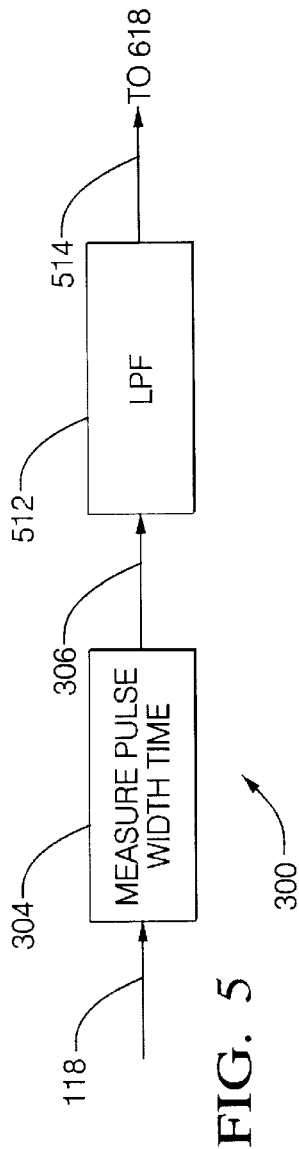
FIG. 5 is a generalized schematic representation of a low velocity estimator with a low pass filter.

In FIG. 4, a low velocity estimator is shown generally at 300. The low velocity estimator 300 comprises a clock 304 operative to accept as input thereto the signal 118 in the nature of a pulse train. The clock 304 measures the amount of time between the elements of the pulse train 118 and provides as output a signal 306, the instantaneous estimated angular velocity of the motor. In FIG. 5, the instantaneous estimated angular velocity 306 of the motor shaft may also be low pass filtered by conventional filtering techniques at 512 yielding a filtered version of the instantaneous estimated angular velocity 514.

In an exemplary embodiment of the present invention, the average estimated angular velocity 410 of the motor shaft and the instantaneous estimated angular velocity 306 of the motor shaft are provided to the blend function 600 of FIG. 6. The blend function 600 comprises a function generator 604 operative to accept as input thereto the average estimated angular velocity 410 of the motor shaft and to provide as output a first weighting parameter, m designated by the reference numeral 606. The first weighting parameter, m, has a value of between zero and one. The function generator 604 is characterized by an adjustable angular velocity window $\omega_{max}-\omega_{min}$, whereby if the average estimated angular velocity, 410 of the motor shaft is less than $\omega_{min}$, then m equals zero. If the average estimated angular velocity 410 of the motor is between $\omega_{min}$ and $\omega_{max}$, then m lies between zero and one, and if the average estimated angular velocity 410 of the motor shaft is greater than $\omega_{max}$ then m equals one. The function generator 604 may be a piecewise linear function or may be a continuous function ranging between zero and one. The first weighting parameter, m 606, is multiplied by the average estimated angular velocity 410 of the motor shaft at 612 to provide a weighted average estimated angular velocity 620 of the motor shaft. The blend function 600 further comprises a bias signal, V, 610 equal to a constant value such as unity. The first weighting parameter, m 606, is subtracted from the bias signal 610 at 614 yielding a complimentary weighting parameter, (c=V−m) 616. The complimentary weighting parameter 616 is multiplied by the instantaneous estimated angular velocity 306 of the motor at 618 to provide a complimentary weighted average estimated angular velocity 622 of the motor shaft. The weighted average estimated angular velocity 620 of the motor and the complimentary weighted average estimated angular velocity 622 of the motor shaft are summed at 624 to yield an estimated angular velocity 626 of the motor shaft optimized for motor shaft angular velocity. The estimated angular velocity 626 of the motor shaft is further processed by the microprocessor 120.

In a second embodiment of the present invention, the filtered instantaneous estimated angular velocity 514 of the motor is provided to the blend function 600 of FIG. 6. The blend function 600 operates upon the filtered instantaneous estimated angular velocity 514 of the motor shaft as described above with respect to the instantaneous estimated angular velocity 306 to produce thereby the filtered optimized estimated angular velocity 626 of the motor for further processing by the microprocessor 120.

In a third embodiment of the present invention, the tachometer measured angular velocity 702 of the motor is provided to the blend function 600 of FIG. 6. The blend function 600 operates upon the tachometer measured angular velocity 702 of the motor shaft as described above with respect to the instantaneous estimated angular velocity 306 to produce thereby the filtered optimized estimated angular velocity 626 of the motor for further processing by the microprocessor 120.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A method of optimizing an estimation of an angular velocity of an electric power steering motor for an automobile, the method comprising:

estimating an average angular velocity of the motor;

estimating an instantaneous angular velocity of the motor;

weighting the estimated average angular velocity of the motor;

weighting the estimated instantaneous angular velocity of the motor; and combining the weighted estimated average angular velocity of the motor and the weighted estimated instantaneous angular velocity of the motor.

2. The method as set forth in claim 1 further comprising pulse encoding the motor.

3. The method as set forth in claim 1 wherein estimating an average angular velocity of the motor includes estimating the average angular velocity of the motor by a discrete position difference calculation.

4. The method as set forth in claim 2 wherein estimating an instantaneous angular velocity of the motor includes measuring an amount of time between encoded pulses.

5. The method as set forth in claim 2 wherein estimating an average angular velocity of the motor includes counting an number of encoded pulses over a prescribed period of time.

6. The method as set forth in claim 4 wherein estimating an instantaneous angular velocity of the motor includes low pass filtering an instantaneous average angular velocity.

7. The method as set forth in claim 1 wherein weighting the estimated average angular velocity of the motor includes weighting the estimated average angular velocity with a first weighting parameter generated by a function generator.

8. The method as set forth in claim 7 wherein weighting the estimated average angular velocity of the motor includes weighting the estimated average angular velocity over a range of angular velocities.

9. The method as set forth in claim 7 wherein weighting an estimated instantaneous average velocity of the motor includes weighting the estimated instantaneous angular velocity with a complimentary weighting parameter according to the equation:

$$c = V - m;$$

wherein c is the complimentary weighting parameter, V is a constant value and m is the first weighting parameter.

10. The method as set forth in claim 1 wherein estimating the instantaneous angular velocity of the motor includes measuring the angular velocity of the motor with a tachometer.

11. The method as set forth in claim 7 wherein the first weighting parameter comprises a number between zero and one.

12. The method as set forth in claim 9 wherein the constant value comprises a number equal to one.

* * * * *